United States Patent
Jiang

(10) Patent No.: US 9,237,441 B2
(45) Date of Patent: Jan. 12, 2016

(54) METHOD AND APPARATUS FOR CONFIGURING SIGNALING RADIO BEARER IN A WIRELESS COMMUNICATIONS SYSTEM

(75) Inventor: Sam Shiaw-Shiang Jiang, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 2486 days.

(21) Appl. No.: 11/984,779

(22) Filed: Nov. 21, 2007

(65) Prior Publication Data

US 2008/0118066 A1    May 22, 2008

Related U.S. Application Data

(60) Provisional application No. 60/860,223, filed on Nov. 21, 2006.

(51) Int. Cl.
*H04L 9/06* (2006.01)
*H04W 12/02* (2009.01)
*H04W 72/04* (2009.01)

(52) U.S. Cl.
CPC .......... *H04W 12/02* (2013.01); *H04W 72/0406* (2013.01)

(58) Field of Classification Search
USPC ........................................................ 380/270
See application file for complete search history.

(56) References Cited

U.S. PATENT DOCUMENTS

| 2002/0066011 | A1 | 5/2002 | Vialen et al. |
| 2003/0054766 | A1* | 3/2003 | Clough et al. ................ 455/41 |
| 2005/0036619 | A1 | 2/2005 | Funnell |
| 2005/0243849 | A1* | 11/2005 | Wentink ...................... 370/412 |

FOREIGN PATENT DOCUMENTS

| JP | H0340689 A | 2/1991 |
| JP | 2002198895 A | 7/2002 |
| KR | 20020040834 A | 5/2002 |
| KR | 20020078682 A | 10/2002 |
| KR | 1020060117159 A | 11/2006 |

OTHER PUBLICATIONS

3GPP RAN WG2:"3rd Generation Partnership Project; Technical Specification Group Radio Access Network; Evolved Universal Terrestrial Radio Access (E-UTRA) and Evolved Universal Terrestrial Radio Access Network (E-UTRAN) ; Overall description; Stage 2 (Release X), TS 36.300 V0.1.0" 3GPP Technical Specifications, Oct. 2006, pp. 1-50.*
Samsung et al., 3 GPP TSG-RAN2 Meeting #52, Mar. 2006-Mar. 31, 2006, pp. 1-3, XP002464337.

(Continued)

*Primary Examiner* — David Le
*Assistant Examiner* — Devin Almeida
(74) *Attorney, Agent, or Firm* — Blue Capital Law Firm, P.C.

(57) ABSTRACT

A method for configuring signaling radio bearer in a wireless communications system includes not ciphering a non-concatenated message on a radio resource control layer or its lower layer and transmitting a concatenated message and the non-concatenated message on different signaling radio bearers, wherein a non-concatenated message consists of a Non-Access Stratum message only and a concatenated message consists of both Non-Access Stratum message and Access Stratum message.

6 Claims, 5 Drawing Sheets

(56) References Cited

OTHER PUBLICATIONS

Universal Mobile Telecommunications System (UMTS), (3 GPP TS 33.102 version 7.0.0 Release 7), Dec. 1, 2005, pp. 1-64, XP014032863.
Nokia et al., 3GPP TSG-SA WG3 #44, Jul. 11, 2006, pp. 1-4, XP003022038.
Shinsaku Kiyomoto, Toshiaki Tanaka, Mariko Yoshida and Masahiro Kuroda, "Design of Security Architecture for Beyond 3G Mobile Terminals", IPSJ Journal, Japan, Information Processing Society of Japan, Aug. 15, 2004, vol. 45, No. 8, p. 1856-p. 1872.
Security Technique for Realizing SAE/LTE, Oct. 1, 2009, NTT DoCoMo Technical Journal, vol. 17, No. 3, p. 27-p. 30, NTT DoCoMo, Inc.
Long Term Evolution (LTE), Sep. 2008, p. 2-p. 14, technical white paper, Motorola, Inc.
Ericsson: "RRC security handling, Tdoc R2-063231" 3GPP TSG-RAN WG2 #56, Nov. 6-10, 2006, pp. 1-2, XP-002481433.
NEC: "Integrity Protection on NAS Transfer, R2-061975," TSG-RAN Working Group 2 #53bis, Jun. 27-30, 2006, pp. 1-2, XP-002481434.

3GPP TR 25.813 V7.1.0 (Sep. 2006) 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7), pp. 1-41.
3GPP RAN WG2:"3rd Generation Partnership Project; Technical Specification Group Radio Access Network; Evolved Universal Terrestrial Radio Access (E-UTRA) and Evolved Universal Terrestrial Radio Access Network (E-UTRAN) ; Overall description; Stage 2 (Release X), TS 36.300 V0.1.0" 3GPP Technical Specifications, Oct. 2006, pp. 1-50, XP002483486.
Tallinn, Estonia, 3GPP TSG SA WG3 Security—SA3 # 44, Jul. 11-14, 2006, pp. 1-42, Draft S3-060564, Nokia, Siemens, Ericsson, Vodafone, Huawei; "Rationale and track of security decisions in Long Term Evolved RAN/3GPP System Architecture Evolution" XP-002482515.
3GPP TS 36.300 V0.2.0 (Nov. 2006) Technical Specification Group Radio Access Network; Evolved Universal Terrestrial Radio Access (E-UTRA) and Evolved Universal Terrestrial Radio Access Network (E-UTRAN); Overall description; Stage 2.

* cited by examiner

# METHOD AND APPARATUS FOR CONFIGURING SIGNALING RADIO BEARER IN A WIRELESS COMMUNICATIONS SYSTEM

CROSS REFERENCE TO RELATED APPLICATIONS

This application claims the benefit of U.S. Provisional Application No. 60/860,223, filed on Nov. 21, 2006 and entitled "Security structure for LTE", the contents of which are incorporated herein by reference.

BACKGROUND OF THE INVENTION

1. Field of the Invention

The present invention relates to a method and apparatus for configuring signaling radio bearer in a wireless communications system, and more particularly, to a method and apparatus for accurately configuring signaling radio bearer in a wireless communications system, so as to enhance information security.

2. Description of the Prior Art

The third generation (3G) mobile telecommunications system provides high frequency spectrum utilization, universal coverage, and high quality, high-speed multimedia data transmission, and also meets all kinds of QoS requirements simultaneously, providing diverse, flexible, two-way transmission services and better communication quality to reduce transmission interruption rates. According to the related protocol specifications, a protocol stack of the 3G mobile telecommunications system can be segmented into access stratum (AS) and non-access stratum (NAS). The AS comprises a Radio Resource Control (RRC), Radio Link Control (RLC), Media Access Control (MAC), Packet Data Convergence Protocol (PDCP), Broadcast/Multicast Control (BMC) and other sub-layers of different functions. Those skilled in the art are familiar with the operation of the above-mentioned sub-layers; therefore, they will not be further mentioned.

Long Term Evolution wireless communications system (LTE system), an advanced high-speed wireless communications system established upon the 3G mobile telecommunications system, supports only packet-switched transmission, and tends to implement both Medium Access Control (MAC) layer and Radio Link Control (RLC) layer in one single communication site, such as in Node B alone rather than in Node B and RNC (Radio Network Controller) respectively, so that the system structure becomes simpler.

A complete protocol specification is accomplished with lasting discussion, editing, and modification. Now, parts of the LTE structure are under Technical Report (TR) stage, meaning that the related protocol specifications are not finished. Therefore, many functions are still For Further Study (FFS).

According to the current system structure of the LTE system, the following can be summarized:

1. For User Plane, the layer structure is, from low to high, PHY (Physical layer), MAC, RLC, and PDCP.

2. For Control Plane, the layer structure is, from low to high, PHY, MAC, RLC, RRC, PDCP, and NAS.

3. For User Plane, ciphering is performed in PDCP.

4. For Control Plane, ciphering and IP for RRC messages are done in RRC and ciphering and IP for NAS messages are done in PDCP.

5. NAS messages may or may not be concatenated with RRC messages.

6. No IP from RRC for non-concatenated messages.

7. IP from RRC for concatenated NAS messages is FFS.

8. Protocol error detection and recovery function is performed in RLC.

Therefore, the prior art does not well specify configuration of signaling radio bearer, and the operation of ciphering from RRC for non-concatenated NAS messages.

SUMMARY OF THE INVENTION

According to the present invention, a method for configuring signaling radio bearers in a wireless communications system comprises performing a first ciphering procedure for a first Non-Access Stratum message to get a second Non-Access Stratum message, performing the first ciphering procedure for a third Non-Access Stratum message to get a fourth Non-Access Stratum message, generating a Radio Resource Control message, which is not ciphered, in a Radio Resource Control layer, combining the second Non-Access Stratum message with the Radio Resource Control message to form a first concatenated message, performing a second ciphering procedure for the first concatenated message to get a second concatenated message, and not combining the fourth Non-Access Stratum message with any Radio Resource Control message to get a non-concatenated message. The method is characterized by not performing the second ciphering procedure for the non-concatenated message, transmitting the non-concatenated message on a first signaling radio bearer, and transmitting the second concatenated message on a second signaling radio bearer, which is different from the first signaling radio bearer.

According to the present invention, a method for configuring signaling radio bearers in a wireless communications system comprises performing a first ciphering procedure for a first Non-Access Stratum message to get a second Non-Access Stratum message, performing the first ciphering procedure for a third Non-Access Stratum message to get a fourth Non-Access Stratum message, generating a Radio Resource Control message, which is not ciphered, in a Radio Resource Control layer, combining the second Non-Access Stratum message with the Radio Resource Control message to form a first concatenated message, performing a second ciphering procedure for the first concatenated message to get a second concatenated message, and not combining the fourth Non-Access Stratum message with any Radio Resource Control message to get a non-concatenated message. The method is characterized by performing the second ciphering procedure for the non-concatenated message, transmitting the non-concatenated message on a signaling radio bearer, and transmitting the second concatenated message on the signaling radio bearer.

According to the present invention, a method for configuring signaling radio bearers in a wireless communications system comprises performing a first ciphering procedure for a first Non-Access Stratum message to get a second Non-Access Stratum message, performing the first ciphering procedure for a third Non-Access Stratum message to get a fourth Non-Access Stratum message, generating a Radio Resource Control message, which is not ciphered, in a Radio Resource Control layer, combining the second Non-Access Stratum message with the Radio Resource Control message to form a first concatenated message, performing a second ciphering procedure for the first concatenated message to get a second concatenated message, and not combining the fourth Non-Access Stratum message with any Radio Resource Control message to get a non-concatenated message. The method is characterized by not performing the second ciphering procedure for the non-concatenated message, adding a field to the non-concatenated message for indicating a type of the non-concatenated message in the Radio Resource Control layer, adding the field to the second concatenated message for indicating a type of the second concatenated message in the Radio Resource Control layer, not ciphering the field, transmitting the non-concatenated message on a signaling radio bearer, and transmitting the second concatenated message on the signaling radio bearer.

According to the present invention, a communications device for accurately configuring signaling radio bearers in a wireless communications system comprises a control circuit for realizing functions of the communications device, a processor installed in the control circuit, for executing a program code to command the control circuit, and a memory installed in the control circuit and coupled to the processor for storing the program code. The program code comprises performing a first ciphering procedure for a first Non-Access Stratum message to get a second Non-Access Stratum message, performing the first ciphering procedure for a third Non-Access Stratum message to get a fourth Non-Access Stratum message, generating a Radio Resource Control message, which is not ciphered, in a Radio Resource Control entity, combining the second Non-Access Stratum message with the Radio Resource Control message to form a first concatenated message, performing a second ciphering procedure for the first concatenated message to get a second concatenated message, and not combining the fourth Non-Access Stratum message with any Radio Resource Control message to get a non-concatenated message. The program code is characterized by not performing the second ciphering procedure for the non-concatenated message, transmitting the non-concatenated message on a first signaling radio bearer, and transmitting the second concatenated message on a second signaling radio bearer, which is different from the first signaling radio bearer.

According to the present invention, a communications device for accurately configuring signaling radio bearers in a wireless communications system comprises a control circuit for realizing functions of the communications device, a processor installed in the control circuit, for executing a program code to command the control circuit, and a memory installed in the control circuit and coupled to the processor for storing the program code. The program code comprises performing a first ciphering procedure for a first Non-Access Stratum message to get a second Non-Access Stratum message, performing the first ciphering procedure for a third Non-Access Stratum message to get a fourth Non-Access Stratum message, generating a Radio Resource Control message, which is not ciphered, in a Radio Resource Control entity, combining the second Non-Access Stratum message with the Radio Resource Control message to form a first concatenated message, performing a second ciphering procedure for the first concatenated message to get a second concatenated message, and not combining the fourth Non-Access Stratum message with any Radio Resource Control message to get a non-concatenated message. The program code is characterized by performing the second ciphering procedure for the non-concatenated message, transmitting the non-concatenated message on a signaling radio bearer, and transmitting the second concatenated message on the signaling radio bearer.

According to the present invention, a communications device for accurately configuring signaling radio bearers in a wireless communications system comprises a control circuit for realizing functions of the communications device, a processor installed in the control circuit, for executing a program code to command the control circuit, and a memory installed in the control circuit and coupled to the processor for storing the program code. The program code comprises performing a first ciphering procedure for a first Non-Access Stratum message to get a second Non-Access Stratum message, performing the first ciphering procedure for a third Non-Access Stratum message to get a fourth Non-Access Stratum message, generating a Radio Resource Control message, which is not ciphered, in a Radio Resource Control entity, combining the second Non-Access Stratum message with the Radio Resource Control message to form a first concatenated message, performing a second ciphering procedure for the first concatenated message to get a second concatenated message, and not combining the fourth Non-Access Stratum message with any Radio Resource Control message to get a non-concatenated message. The program code is characterized by not performing the second ciphering procedure for the non-concatenated message, adding a field to the non-concatenated message for indicating a type of the non-concatenated message in the Radio Resource Control entity, adding the field to the second concatenated message for indicating a type of the second concatenated message in the Radio Resource Control entity, not ciphering the field, transmitting the non-concatenated message on a signaling radio bearer, and transmitting the second concatenated message on the signaling radio bearer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
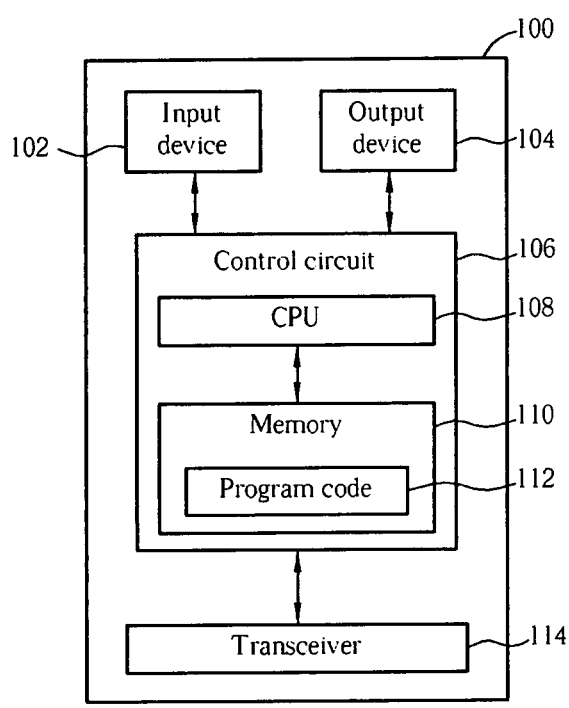
FIG. 1 is a function block diagram of a wireless communications device.

Please refer to FIG. 1, which is a functional block diagram of a communications device 100 in a wireless communications system. The wireless communications system is preferably the LTE system. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 2:
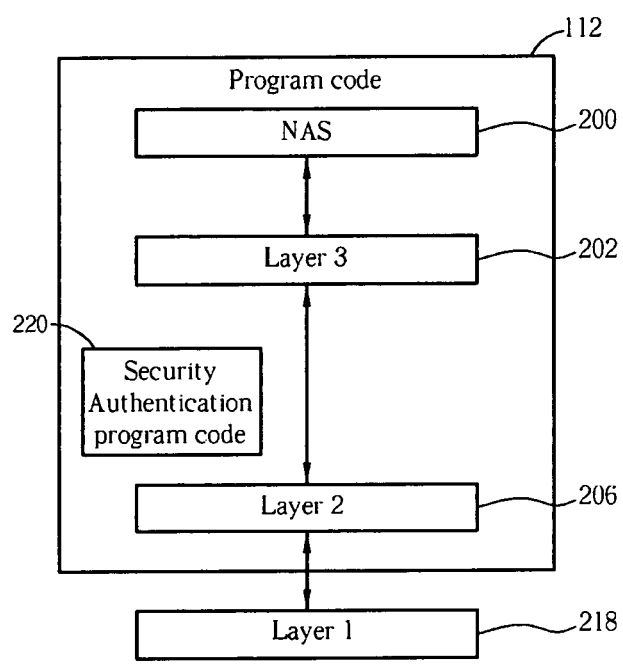
FIG. 2 is a diagram of program code of FIG. 1.

Please continue to refer to FIG. 2. FIG. 2 is a diagram of the program code 112 shown in FIG. 1. The program code 112 includes a Non Access Stratum (NAS) 200, a Layer 3 202, and a Layer 2 206, and is coupled to a Layer 1 218. The NAS 200 can generate NAS messages for realizing NAS applications.

The Layer 3 202 is preferably composed of an RRC layer and a PDCP layer, for performing resource control. The Layer 2 206 performs link control, and the Layer 1 218 performs physical connections.

Figure 3:
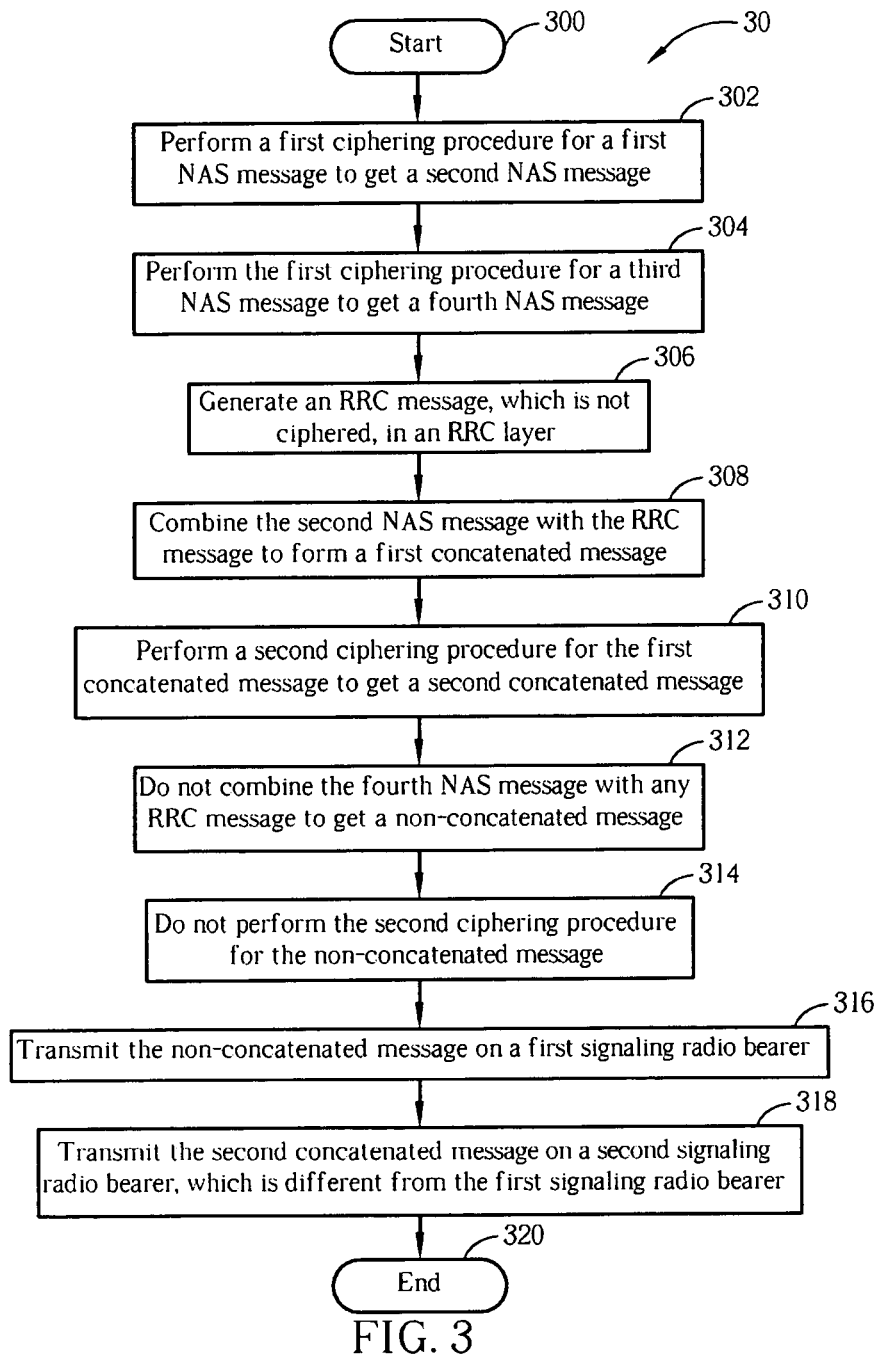
FIG. 3 to FIG. 5 are flowcharts of processes according to embodiments of the present invention.

In order to enhance information security, the program code 112 can perform ciphering protection for messages, to protect user data and signaling information from being intercepted by unauthorized devices. In such a situation, the embodiment of the present invention provides a Security Authentication program code 220, for accurately performing ciphering. Please refer to FIG. 3, which illustrates a schematic diagram of a process 30. The process 30 is utilized for performing ciphering in a wireless communications system, and can be compiled into the Security Authentication program code 220. The process 30 comprises the following steps:

Step 300: Start.
Step 302: Perform a first ciphering procedure for a first NAS message to get a second NAS message.
Step 304: Perform the first ciphering procedure for a third NAS message to get a fourth NAS message.
Step 306: Generate an RRC message, which is not ciphered, in an RRC layer.
Step 308: Combine the second NAS message with the RRC message to form a first concatenated message.
Step 310: Perform a second ciphering procedure for the first concatenated message to get a second concatenated message.
Step 312: Do not combine the fourth NAS message with any RRC message to get a non-concatenated message.
Step 314: Do not perform the second ciphering procedure for the non-concatenated message.
Step 316: Transmit the non-concatenated message on a first signaling radio bearer.
Step 318: Transmit the second concatenated message on a second signaling radio bearer, which is different from the first signaling radio bearer.
Step 320: End.

According to the process 30, non-concatenated messages are not performed the second ciphering procedure, and the non-concatenated messages and the concatenated messages are transmitted on different signaling radio bearers. Preferably, the first ciphering procedure is performed by the upper layer of the RRC layer, while the second ciphering procedure is performed by the RRC layer or its lower layer.

In such a situation, via different signaling radio bearers, the RRC layer in the receiver can determine whether the received message is a non-concatenated message or a concatenated message, thus perform deciphering for the concatenated message, and deliver the non-concatenated message to the upper layer without any processing.

Therefore, via the process 30, the embodiment of the present invention can accurately perform ciphering protection procedures for the concatenated message containing the RRC message and the NAS message, and for the non-concatenated message containing only the NAS message, so as to enhance information security.

Figure 4:
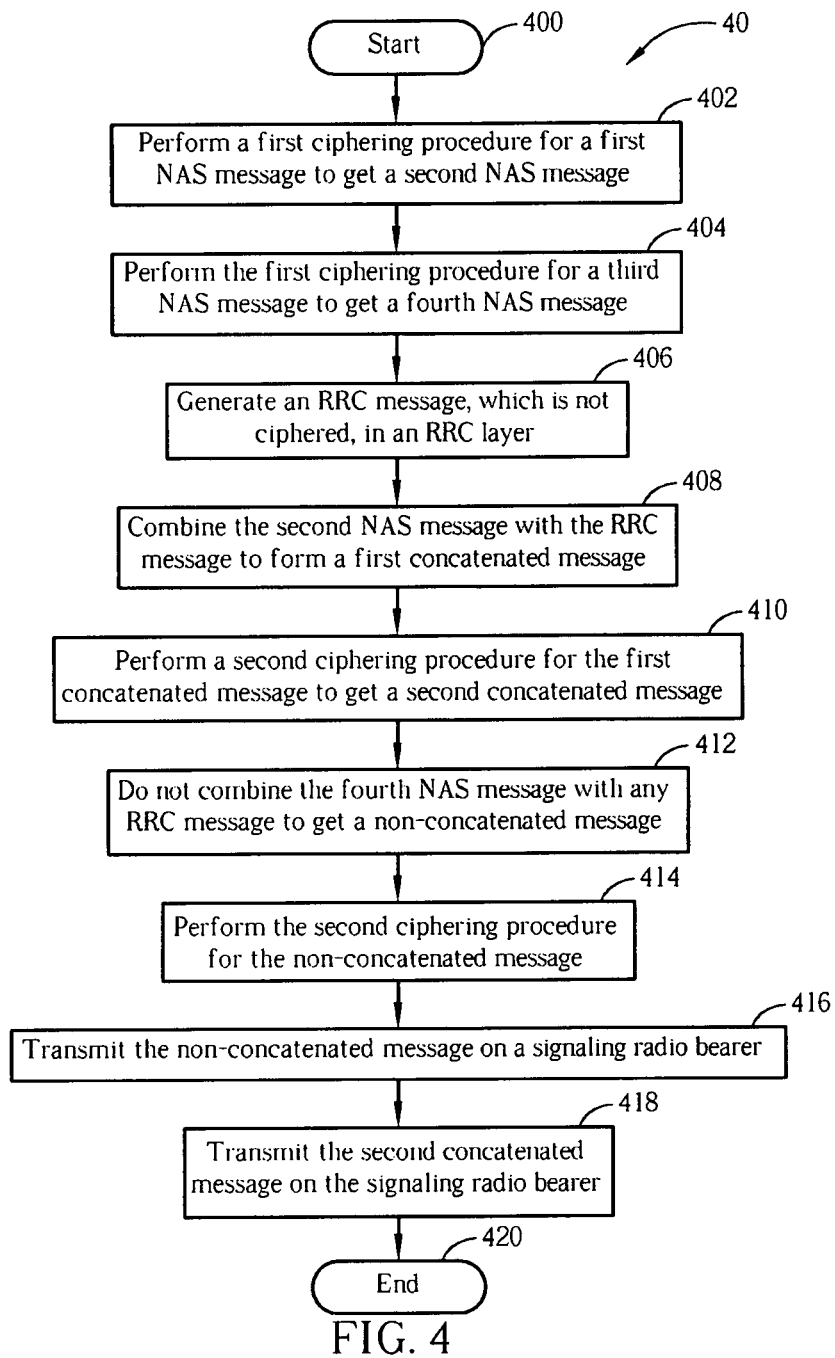

Please refer to FIG. 4, which illustrates a schematic diagram of a process 40. The process 40 is utilized for performing ciphering in a wireless communications system, and can be compiled into the Security Authentication program code 220. The process 40 comprises the following steps:

Step 400: Start.
Step 402: Perform a first ciphering procedure for a first NAS message to get a second NAS message.
Step 404: Perform the first ciphering procedure for a third NAS message to get a fourth NAS message.
Step 406: Generate an RRC message, which is not ciphered, in an RRC layer.
Step 408: Combine the second NAS message with the RRC message to form a first concatenated message.
Step 410: Perform a second ciphering procedure for the first concatenated message to get a second concatenated message.
Step 412: Do not combine the fourth NAS message with any RRC message to get a non-concatenated message.
Step 414: Perform the second ciphering procedure for the non-concatenated message.
Step 416: Transmit the non-concatenated message on a signaling radio bearer.
Step 418: Transmit the second concatenated message on the signaling radio bearer.
Step 420: End.

According to the process 40, non-concatenated messages are performed the second ciphering procedure, and the non-concatenated messages and the concatenated messages are transmitted on the same signaling radio bearer. Preferably, the first ciphering procedure is performed by the upper layer of the RRC layer, while the second ciphering procedure is performed by the RRC layer or its lower layer.

In such a situation, the RRC layer of the receiver does not determine whether a message received on a signaling radio bearer is a non-concatenated message or a concatenated message, and performs deciphering for all the received messages, and then delivers the non-concatenated message to the upper layer.

Therefore, via the process 40, the embodiment of the present invention can accurately perform ciphering protection procedures for the concatenated message containing the RRC message and the NAS message, and for the non-concatenated message containing only the NAS message, so as to enhance information security.

Figure 5:
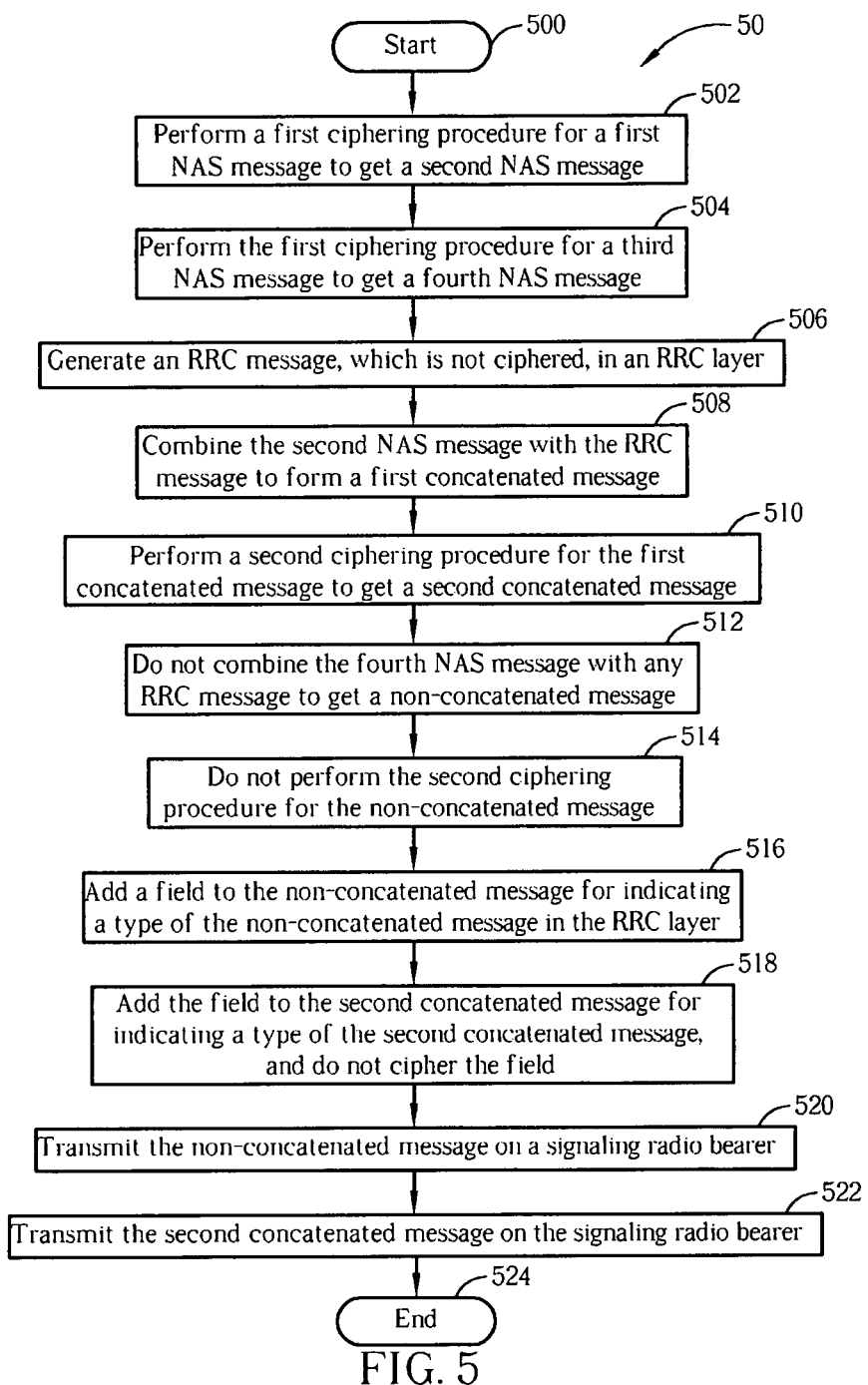

Please refer to FIG. 5, which illustrates a schematic diagram of a process 50. The process 50 is utilized for performing ciphering in a wireless communications system, and can be compiled into the Security Authentication program code 220. The process 50 comprises the following steps:

Step 500: Start.
Step 502: Perform a first ciphering procedure for a first NAS message to get a second NAS message.
Step 504: Perform the first ciphering procedure for a third NAS message to get a fourth NAS message.
Step 506: Generate an RRC message, which is not ciphered, in an RRC layer.
Step 508: Combine the second NAS message with the RRC message to form a first concatenated message.
Step 510: Perform a second ciphering procedure for the first concatenated message to get a second concatenated message.
Step 512: Do not combine the fourth NAS message with any RRC message to get a non-concatenated message.
Step 514: Do not perform the second ciphering procedure for the non-concatenated message.
Step 516: Add a field to the non-concatenated message for indicating a type of the non-concatenated message in the RRC layer.
Step 518: Add the field to the second concatenated message for indicating a type of the second concatenated message, and do not cipher the field.
Step 520: Transmit the non-concatenated message on a signaling radio bearer.
Step 522: Transmit the second concatenated message on the signaling radio bearer.
Step 524: End.

According to the process 50, non-concatenated messages are not performed the second ciphering procedure, and the non-concatenated messages and the concatenated messages are transmitted on the same signaling radio bearer. Preferably, the first ciphering procedure is performed by the upper layer of the RRC layer, while the second ciphering procedure is performed by the RRC layer or its lower layer.

In such a situation, the RRC layer of the receiver can determine whether the received message is a non-concatenated message or a concatenated message according to the field, which is not ciphered, thus perform deciphering for the concatenated message, and deliver the non-concatenated message to the upper layer without any processing.

Therefore, via the process 50, the embodiment of the present invention can accurately perform ciphering protection procedures for the concatenated message containing the RRC message and the NAS message, and for the non-concatenated message containing only the NAS message, so as to enhance information security.

In summary, the embodiment of the present invention provides variable implementations for accurately performing ciphering protection for the concatenated messages and the non-concatenated messages, so as to enhance information security.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing ciphering in a wireless communications system comprising:
    performing a first ciphering procedure for a first Non-Access Stratum message to get a second Non-Access Stratum message;
    performing the first ciphering procedure for a third Non-Access Stratum message to get a fourth Non-Access Stratum message;
    generating a Radio Resource Control message, which is not ciphered, in a Radio Resource Control layer;
    combining the second Non-Access Stratum message with the Radio Resource Control message to form a first concatenated message;
    performing a second ciphering procedure for the first concatenated message to get a second concatenated message; and not combining the fourth Non-Access Stratum message with any Radio Resource Control message to get a first non-concatenated message;
    performing the second ciphering procedure for the first non-concatenated message to get a second non-concatenated message;
    transmitting the second non-concatenated message on a signaling radio bearer; and
    transmitting the second concatenated message on the signaling radio bearer.

2. The method of claim 1, wherein the first ciphering procedure is performed by an upper layer of the Radio Resource Control layer.

3. The method of claim 1, wherein the second ciphering procedure is performed by the Radio Resource Control layer or a lower layer of the Radio Resource Control layer.

4. A communications device for performing ciphering in a wireless communications system comprising:
    a control circuit for realizing functions of the communications device;
    a processor installed in the control circuit, for executing a program code to command the control circuit; and
    a memory installed in the control circuit and coupled to the processor for storing the program code;
    wherein the program code comprises:
        performing a first ciphering procedure for a first Non-Access Stratum message to get a second Non-Access Stratum message;
        performing the first ciphering procedure for a third Non-Access Stratum message to get a fourth Non-Access Stratum message;
        generating a Radio Resource Control message, which is not ciphered, in a Radio Resource Control entity;
        combining the second Non-Access Stratum message with the Radio Resource Control message to form a first concatenated message;
        performing a second ciphering procedure for the first concatenated message to get a second concatenated message; and not combining the fourth Non-Access Stratum message with any Radio Resource Control message to get a first non-concatenated message;
        performing the second ciphering procedure for the first non-concatenated message to get a second non-concatenated message;
        transmitting the second non-concatenated message on a signaling radio bearer; and
        transmitting the second concatenated message on the signaling radio bearer.

5. The communications device of claim 4, wherein the first ciphering procedure is performed by an upper layer entity of the Radio Resource Control entity.

6. The communications device of claim 4, wherein the second ciphering procedure is performed by the Radio Resource Control entity or a lower layer entity of the Radio Resource Control entity.

* * * * *